(12) United States Patent
Schillinger et al.

(10) Patent No.: US 7,856,880 B2
(45) Date of Patent: Dec. 28, 2010

(54) VEHICLE SENSOR FOR DETECTING IMPACT SOUND

(75) Inventors: Jakob Schillinger, Gaimersheim (DE);
Joachim Hrabi, Lenningen (DE);
Dietmar Huber, Eichstätt (DE);
Wilfried Babutzka, Dettingen (DE);
Gúnter Fendt, Schrobenhausen (DE);
Lothar Weichenberger, Kónigsmoos (DE)

(73) Assignee: Conti Temic Microelectronics GmbH, Nuremberg (DE)

( * ) Notice: Subject to any disclaimer, the term of this patent is extended or adjusted under 35 U.S.C. 154(b) by 728 days.

(21) Appl. No.: 10/593,909

(22) PCT Filed: Mar. 24, 2005

(86) PCT No.: PCT/DE2005/000555

§ 371 (c)(1),
(2), (4) Date: Jul. 26, 2007

(87) PCT Pub. No.: WO2005/095907

PCT Pub. Date: Oct. 13, 2005

(65) Prior Publication Data

US 2007/0288139 A1 Dec. 13, 2007

(30) Foreign Application Priority Data

Mar. 26, 2004 (DE) .......................... 10 2004 015 474
May 8, 2004 (DE) .......................... 10 2004 022 822

(51) Int. Cl.
*G01N 29/00* (2006.01)

(52) U.S. Cl. .................... 73/587; 73/517 R; 73/514.32; 73/518

(58) Field of Classification Search ................... 73/587, 73/517 R, 518, 514.32; 29/25.41
See application file for complete search history.

(56) References Cited

U.S. PATENT DOCUMENTS

| | | | | |
|---|---|---|---|---|
| 5,347,867 A | * | 9/1994 | Pangerl | 73/514.32 |
| 5,413,489 A | * | 5/1995 | Switky | 439/71 |
| 5,838,092 A | * | 11/1998 | Wang et al. | 310/326 |
| 5,894,094 A | * | 4/1999 | Kuchler et al. | 73/862.044 |
| 6,113,138 A | * | 9/2000 | Hermann et al. | 280/735 |
| 6,595,544 B1 | | 7/2003 | Hermann | |
| 7,545,294 B2 | * | 6/2009 | Wiese | 341/118 |
| 2007/0288139 A1 | * | 12/2007 | Schillinger et al. | 701/36 |

FOREIGN PATENT DOCUMENTS

| | | |
|---|---|---|
| DE | 08 94 774 | 10/1953 |
| DE | 28 44 646 | 4/1980 |
| DE | 32 28 149 | 2/1984 |
| DE | 37 03 946 | 8/1988 |
| DE | 38 04 483 | 8/1988 |
| DE | 38 17 354 | 12/1988 |
| DE | 93 14 084 | 2/1994 |
| DE | 690 12 429 | 5/1995 |
| DE | 195 11 430 | 10/1996 |
| DE | 196 26 669 | 8/1997 |

(Continued)

Primary Examiner—Jacques M Saint Surin

(57) ABSTRACT

Disclosed is a vehicle sensor (4) for detecting impact sound, including a measured-value sensor (4.1) for detecting an impact sound. The measured-value sensor (4.1) includes several individual, separate measured-value sensing elements (4.1.x), each of which is coupled to a vehicle structure (5) in such a way that impact sound waves are transmitted by the vehicle structure (5) to the measured-value sensing elements (4.1.x).

18 Claims, 13 Drawing Sheets

FOREIGN PATENT DOCUMENTS

| | | |
|---|---|---|
| DE | 694 10 749 | 10/1998 |
| DE | 198 55 452 | 6/2000 |
| DE | 100 15 273 | 10/2001 |
| DE | 100 31 793 | 2/2002 |
| DE | 100 40 113 | 2/2002 |
| DE | 100 58 986 | 6/2002 |
| DE | 102 45 780 | 4/2004 |
| DE | 694 32 396 | 4/2004 |
| EP | 1 019 271 | 7/2000 |
| WO | 2003062780 | 7/2003 |

* cited by examiner

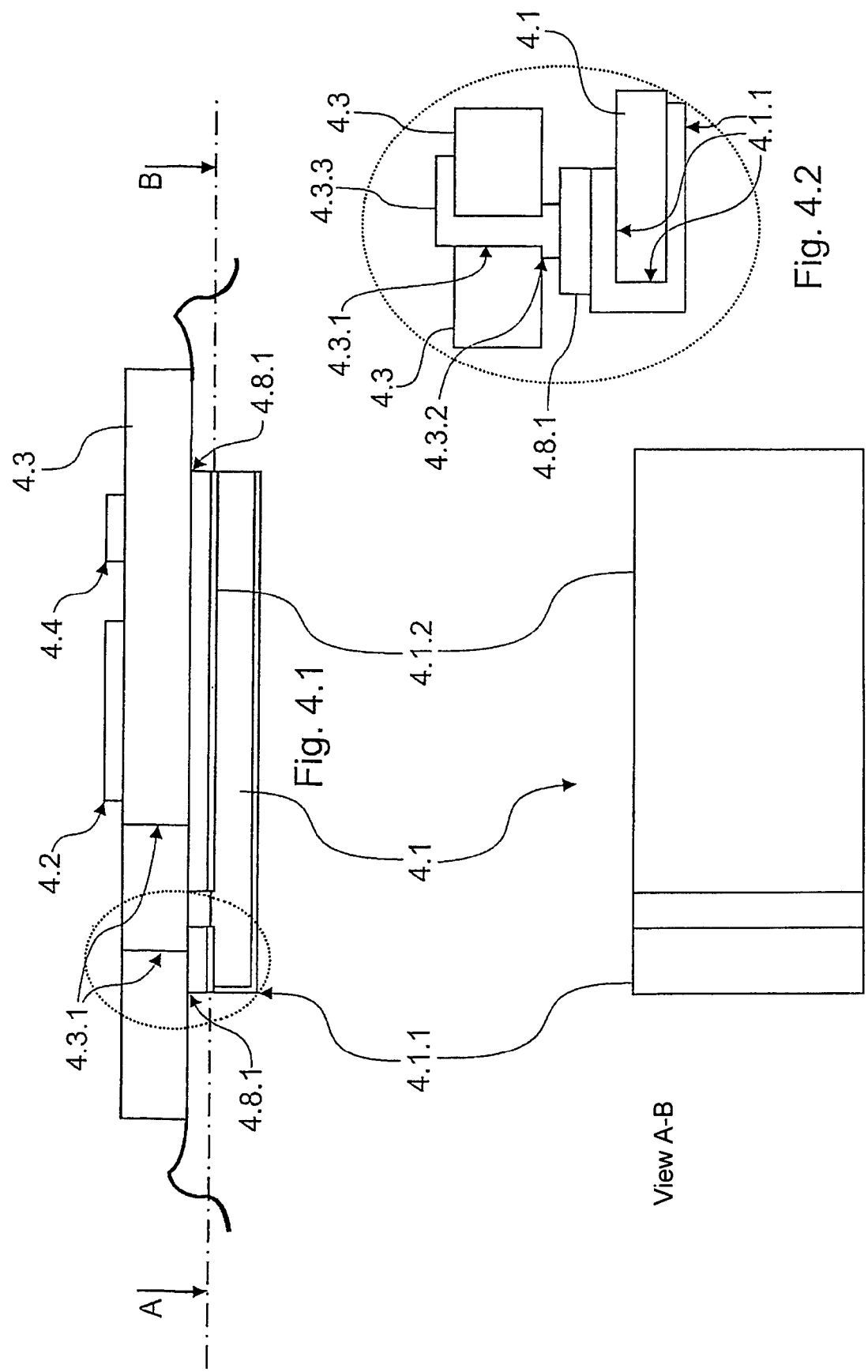

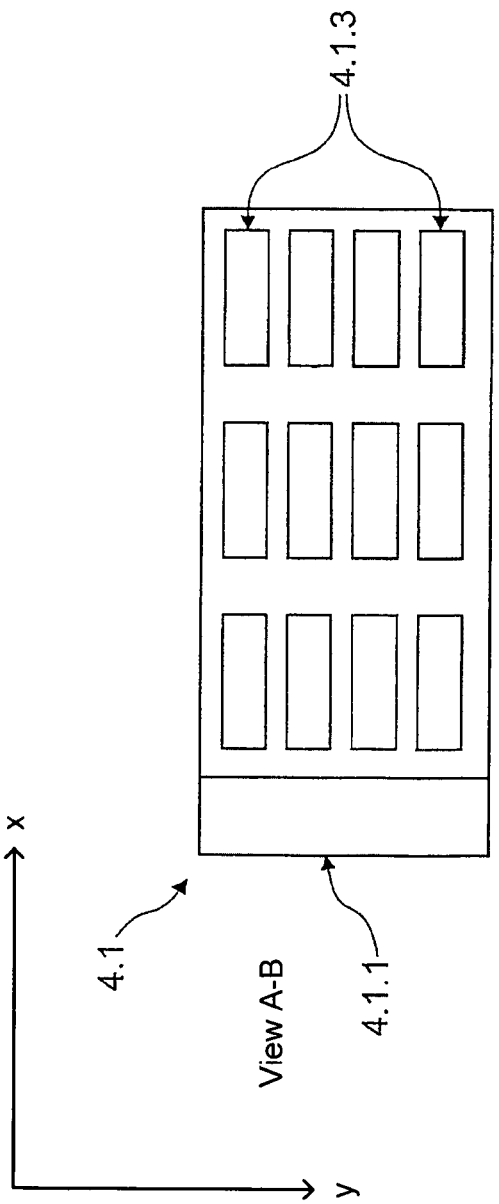
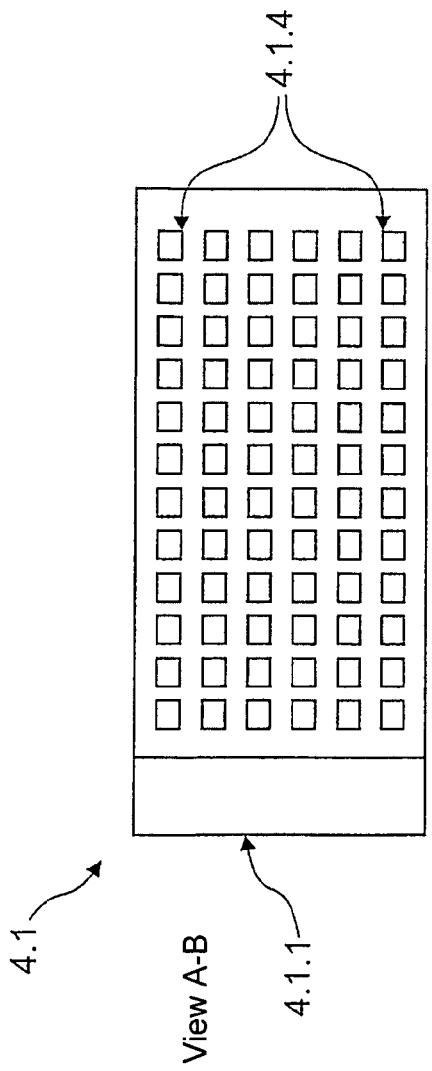

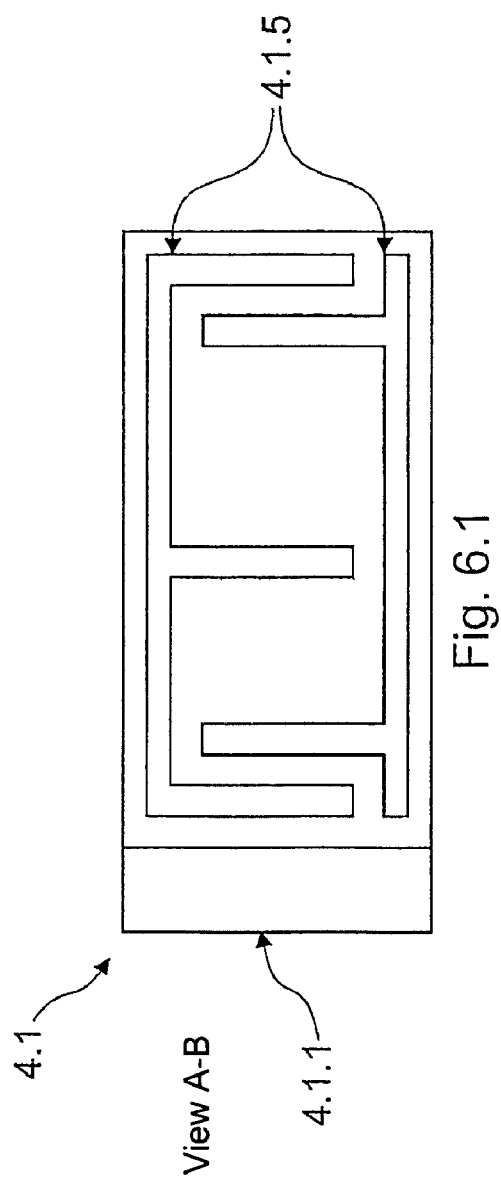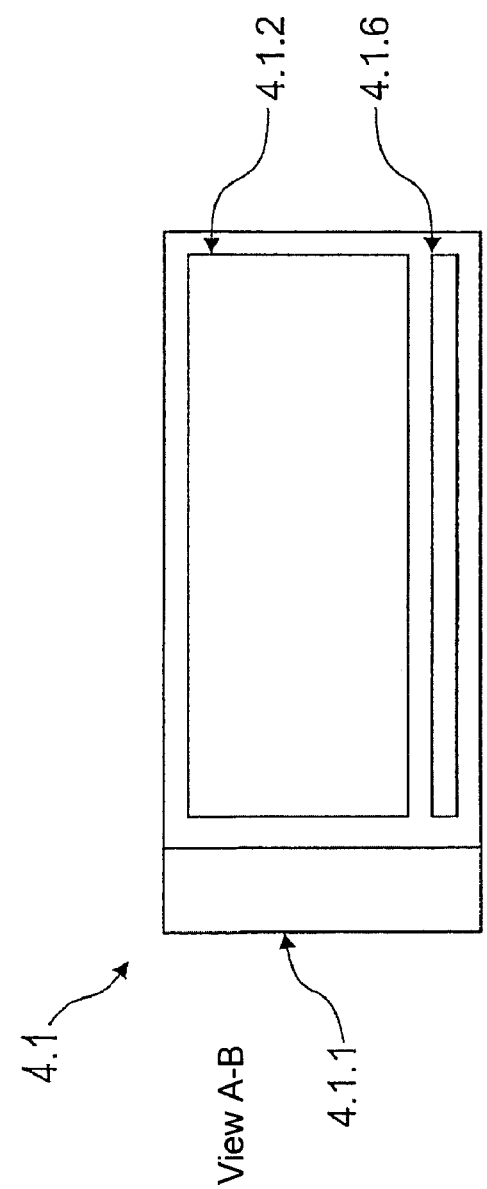

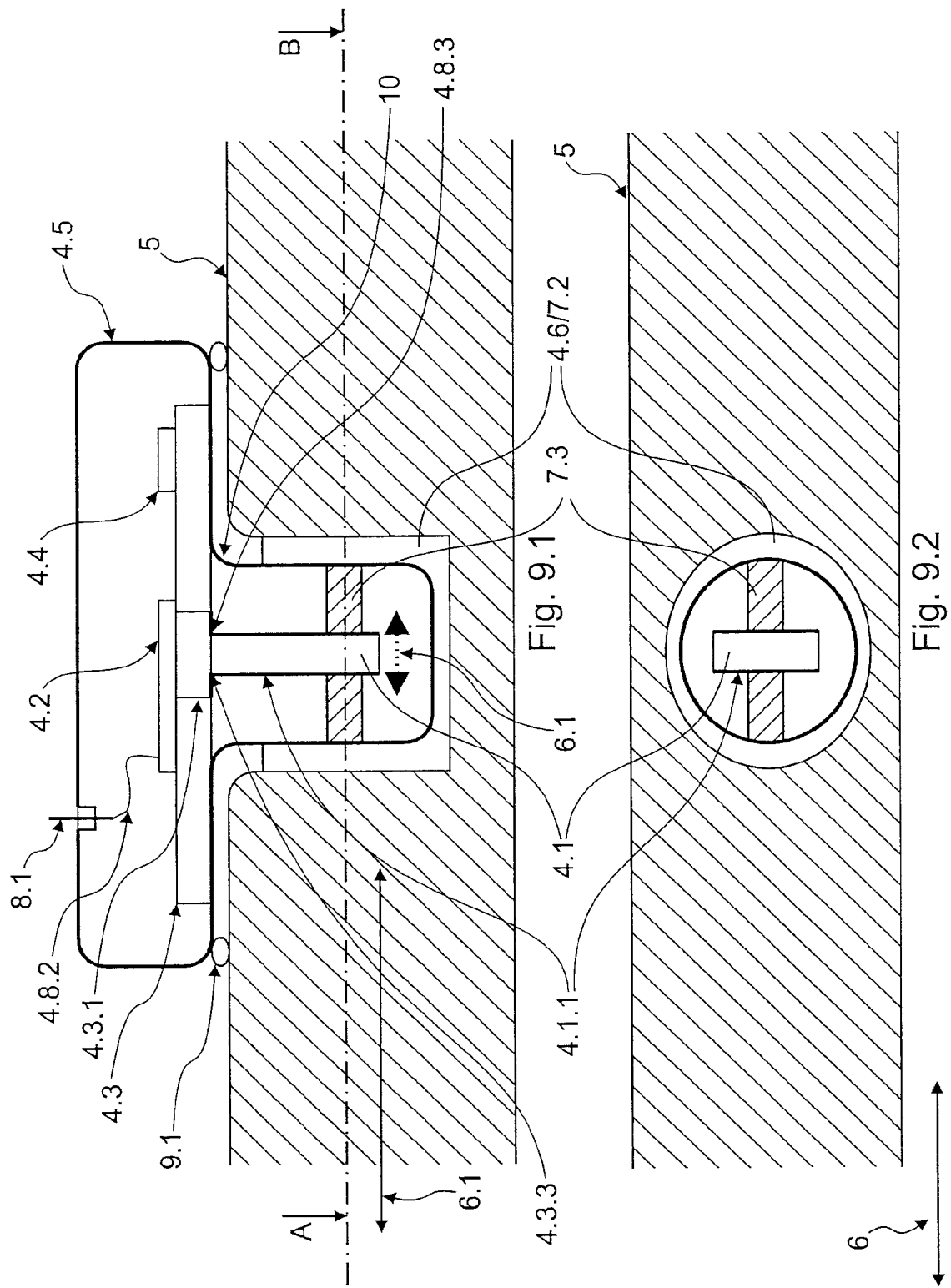

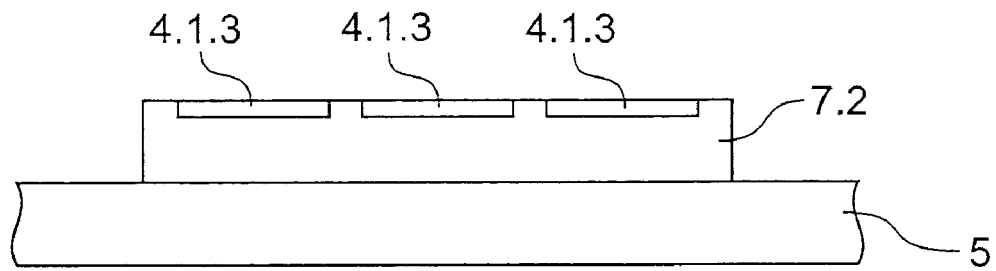
Fig. 10.1
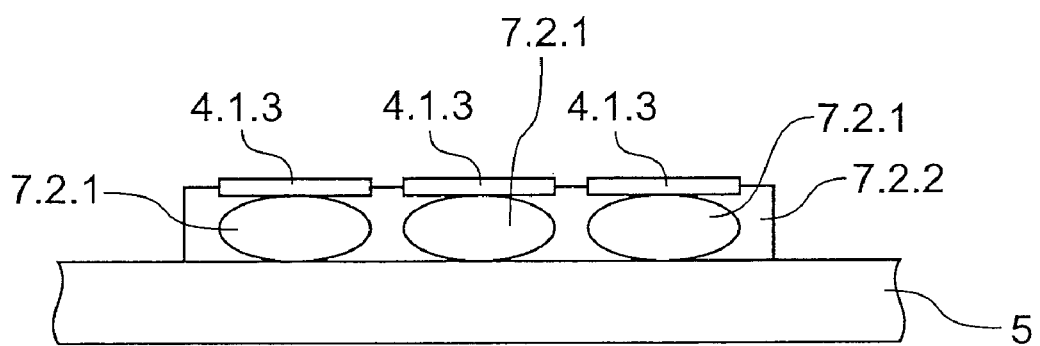
Fig. 10.2
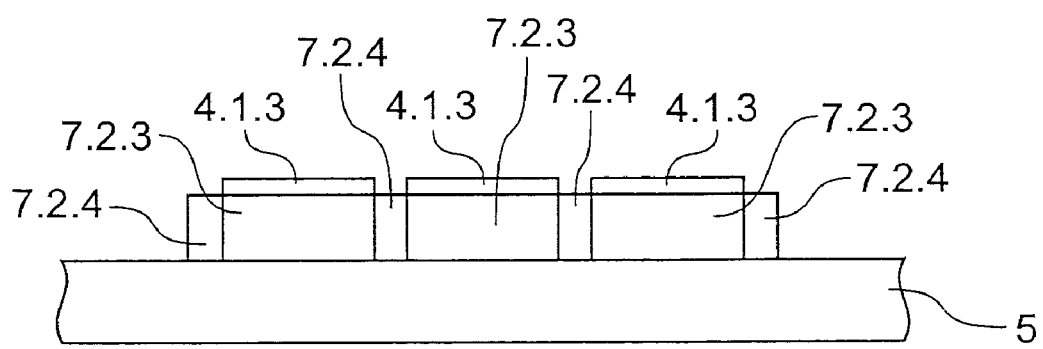
Fig. 10.3

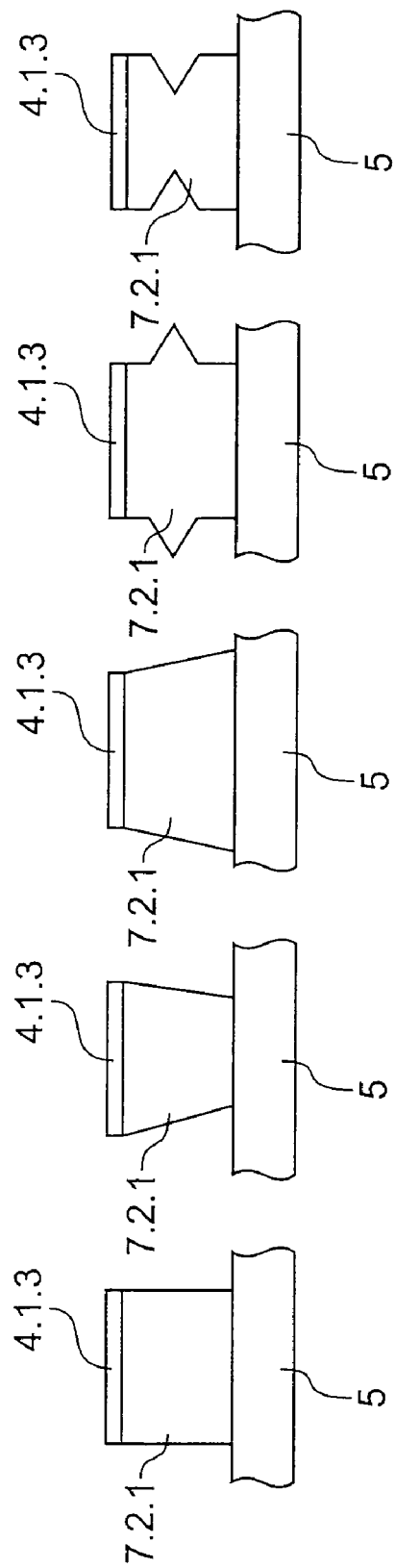
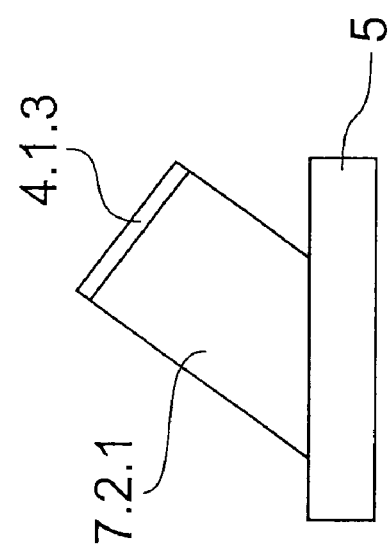
Fig. 11.1
Fig. 11.2

VEHICLE SENSOR FOR DETECTING IMPACT SOUND

BACKGROUND OF THE INVENTION

The invention relates to a vehicle sensor for detecting impact sound comprising a measured-value sensor (4.1) for detecting an impact sound, the measured-value sensor (4.1) comprising several individual, separate measured-value sensing elements (4.1.x), each of which is coupled to a vehicle structure (5) in such a way that impact sound waves are transmitted by the vehicle structure (5) to the measured-value sensing elements (4.1.x), characterized in that the measured-value sensor is a piezoelectric, piezoresistive or capacitive measured-value sensor and that the individual, separate measured-value sensing elements are arranged as electrodes in a two-dimensional form in the measured-value sensor.

It is known that oscillations in the body of a motor vehicle, which are caused for instance by a crash, can be detected by means of an impact sound sensor. For optimally adapting passenger protection to different driving situations, the impact sound sensors are fixed directly outside at the vehicle body or are also arranged in the control unit, as far as it is coupled to the vehicle body with regard to oscillation. Fixing the sensors outside at the vehicle body as lateral or upfront sensors is advantageous in case of a side crash or a crash with an obstacle of small mass, as it enables fast and safe recognition of an accident and thus the efficient application of protection means.

Known apparatuses for triggering safety devices in a vehicle are often equipped with several sensors for detecting impact sound or acceleration. If the sensors are able to detect acceleration of a vehicle and the impact sound simultaneously, the signal portions of acceleration and impact sound as a rule have to be filtered out from the wideband signal by means of a downstream processing unit at high expenditure. In doing so, either digital filters are used, which require a preceding A/D-conversion of the sensor signal or analogous filters are used, the use of which is mostly still more expensive than the use of digital filters. Moreover, the sensors frequently have a different sensitivity direction when it comes to the detection of acceleration or impact sound. Therefore, in a safety device mostly several of these sensors are used.

For instance from U.S. Pat. No. 6,595,544 B1 consideration of acceleration and impact sound signals by means of a sensor is known.

Beyond that, from DE 3703946 a frequency-selective oscillation sensor with a plurality of movable tongues is formed out of a substrate, the tongues being arranged in a row and comprising different lengths, so that each tongue has a different self-resonant frequency and thus is sensitive to a defined frequency region.

WO 03/062780 shows an omni-directional crash sensor, from which preferably a plurality is to be arranged distributed on the windshield to determine in addition to the strength of the crash also from geometrical calculations the direction of the crash.

It is now the object of the present invention to propose a vehicle sensor for detecting impact sound, which enables a simple and exact detection of signal portions of the impact sound and if necessary of acceleration, in order to ensure for instance triggering of a safety device in a vehicle with a preferably low number of sensors.

SUMMARY OF THE INVENTION

This object is achieved by a vehicle sensor for detecting impact sound comprising a measured-value sensor (4.1) for detecting an impact sound, the measured-value sensor (4.1) comprising several individual, separate measured-value sensing elements (4.1.x), each of which is coupled to a vehicle structure (5) in such a way that impact sound waves are transmitted by the vehicle structure (5) to the measured-value sensing elements (4.1.x), characterized in that the measured-value sensor is a piezoelectric, piezoresistive or capacitive measured-value sensor and that the individual, separate measured-value sensing elements are arranged as electrodes in a two-dimensional form in the measured-value sensor.

A substantial thought of the invention is that the measured-value sensor comprises individual measured-value sensing elements, each of these individual measured-value sensing elements allowing for a detection of desired signal portions of the impact sound and, if necessary, of acceleration.

The measured-value sensor is a piezoelectric, piezoresistive or capacitive measured-value sensor, by means of which it is possible to integrate a plurality of individual measured-value sensing elements into a mutual measured-value sensor. The measured-value sensing elements are as electrodes in form of a facet structure or of an array at the measured-value sensor, i.e. they have a two-dimensional structure, by means of which it will be possible to derive the direction of the collision from the signals of the individual measured-value sensing elements.

The invention relates to a vehicle sensor for detecting impact sound, said sensor comprising a measured-value sensor for detecting the impact sound, the measured-value sensor comprising several individual, separate measured-value sensing elements, each of which is coupled to a vehicle structure in such a way that impact sound waves are transmitted by the vehicle structure to the measured-value sensor. The measured-value sensing elements can be embodied sensitive to different frequency regions. The measured-value sensing elements can also have different sensitivity directions. Thus, the vehicle sensor can provide signal portions of the impact sound without requiring expensive filtering of the necessary frequencies out of an otherwise usual wideband signal and therewith an expensive circuit arrangement for filtering. By an adequate arrangement of the individual measured-value sensing elements an appropriate detection of the desired signal portions can be realized, even while taking into consideration different sensitivity directions. So, for example a safety device of a vehicle such as a passenger protection system with a preferably low number of vehicle sensor can be implemented cost-efficiently.

The detection of the different signal portions via the individual measured-value sensing elements, which each comprise a meter electrode, can be effected with the aid of a mutual meter electrode. For this purpose the potentials and the change of potentials, respectively, between the mutual electrode and another meter electrode can be measured and evaluated.

The vehicle sensor is especially suitable to detect longitudinal impact sound waves. Therewith, for example diagnostic devices can be realized, which sever for evaluating crash signatures, stock damages, brake wear, roadbeds, combustion abnormities or drone noises. The forces measured thereby can be axial, bending, shearing, torsion or also acceleration forces. The detection and processing of longitudinal impact sound waves is advantageous, as they allow for a determination of the origin of the impact sound wave. So, with only one vehicle sensor according to the invention principally one level can be monitored with regard to the impact sound.

In a preferred form of embodiment the vehicle sensor is formed such that the individual measured-value sensing elements are coupled to the vehicle structure in such a way that longitudinal and/or transversal impact sound waves are transmitted by the vehicle structure to the measured-value sensor. By the detection of transversal impact sound waves further information can be obtained for example on a crash event, which information can be significant for the control of a safety device.

Based on the different amplitudes of the signal portions of the longitudinal or transversal impact sound or acceleration it can be advantageous, if a processing unit arranged in the vehicle sensor, in particular on a carrier, and which processing unit is preferably formed as an integrated circuit, features sufficient dynamics. Longitudinal impact sound waves mostly comprise a lower amplitude than transversal impact sound waves or also acceleration signals. Therefore, the processing unit can be formed to process signals with different amplitudes without overmodulation, in particular in case that undesired signal portions have not been sufficiently attenuated by the construction of the vehicle sensor according to the invention.

In a preferred form of embodiment of the vehicle sensor the measured-value sensing elements are coupled to the vehicle structure by an elastic or a visco-elastic coupling layer for transmitting the impact sound waves. A coupling layer of this type effects attenuation of certain signal portions when signal portions are transmitted. Thereby, for example a kind of filtering of signal portions, in particular of undesired signal portions, is made possible.

In particular, the visco-elastic coupling layer is embodied as a mutual layer extending over the surface of all measured-value sensing elements between the measured-value sensing elements and the vehicle structure. In doing so, the coupling factor in direction to the measured-value sensor can be higher or at least equal to the coupling factor transversely to the measured-value sensor.

The visco-elastic coupling layer can also be embodied in form of separate nubs between the measured-value sensing elements and the vehicle structure. The nubs can be applied onto the measured-value sensing elements by means of dispensing or by doctor. The free space between the nubs can be filled for example with a hard, inflexible underfiller material. With an arrangement of this type a frequency-dependent transmission of for example the impact sound waves in a sensitivity direction of the vehicle sensor can be realized. Furthermore, crosstalking between the measured-value sensing elements can be prevented.

If the measured-value sensor is connected to the vehicle structure in an array arrangement of the measured-value sensing elements by means of a matrix, which comprises recesses in the region of the measured-value sensing elements, the visco-elastic coupling layer can be embodied in form of fillings of the recesses of the matrix between the measured-value sensing elements and the vehicle structure.

For adapting the active surfaces of the measured-value sensing elements to the vehicle structure and for optimizing the frequency-dependent attenuation, the nubs or fillings of the matrix recesses can comprise different cross-sections, thicknesses or shapes. Further, for optimizing the coupling of the measured-value sensing elements to the vehicle structure while making use of the wave breaking, an adaptation of the wave type, for example a bending, torsion, longitudinal, transversal, Rayleigh or extensional wave to the measurement principle of the measured-value sensor (measurement of pressure, bending, shearing or torsion forces) can take place.

In a preferred form of embodiment of the vehicle sensor the measured-value sensing elements are arranged in form of a facet structure. In an alternative, preferred form of embodiment the measured-value sensing elements are arranged in form of an array. The measured-value sensing elements can comprise a rectangular surface. In these two forms of embodiment of the vehicle sensor the measured-value sensor comprises preferably at least eight measured-value sensing elements. It has shown that for the detection of the impact sound in one level at least eight measured-value sensing elements and measurement electrodes, respectively, are optimal to allow for a reliable determination of the propagation direction of the impact sound wave.

In a further preferred form of embodiment of the vehicle sensor the measured-value sensing elements are arranged in form of a digital structure. The measured-value sensing elements can have a comb-like surface. With a digital structure for example special filter characteristics of the vehicle sensor can be realized. In this form of embodiment of the vehicle sensor the measured-value sensor comprises preferably at least two measured-value sensing elements.

In a further preferred form of embodiment of the vehicle sensor the measured-value sensing elements are arranged in form of a self-testing structure. A self-testing structure can allow for the performance of a self-test of the vehicle sensor. For this purpose, in addition to the other measured-value sensing elements and meter electrodes, resp., a self-testing electrode can be implemented. Via this self-testing electrode a test signal can be supplied, which then can be measured by the other meter electrodes. For this purpose at least two further meter electrodes are necessary apart from the self-testing electrode.

By the geometrical shape of the measured-value sensing elements and of their dimensions, resp., and by the arrangement of the measured-value sensing elements a transmission of certain impact sound waves can be affected. So, an attenuation of undesired signal portions or a preferred transmission of desired signal portions in relation to undesired signal portions can be achieved.

If the vehicle sensor is used for example to detect a motion sequence of a vehicle, the dimensions of the measured-value sensing elements and of the meter electrodes, resp., can be smaller than the smallest wave length to be detected of the impact sound. Therefore, with a facet or an array arrangement the dimensions of the rectangular meter electrodes can be smaller than the smallest wave length to be detected of the impact sound. Analogous thereto the dimensions of the comb-like structure of the meter electrodes in a digital arrangement can be also smaller than the smallest wave length to be detected of the impact sound.

If the vehicle sensor, however, is used e.g. as a wave filter, the dimensions of the measured-value sensing elements and of the meter electrodes, resp., can be greater than the greatest wave length to be detected of the impact sound. Also in this case this is valid for the dimensions of the rectangular meter electrodes in a facet or an array structure as well as for the comb-like structures of the meter electrodes in a digital arrangement.

In particular, the measured-value sensor is formed as a piezoelectric measured-value sensor. Piezoelements are able to detect bending, shearing torsion, traction or pressure forces. They have a high sensitivity and can detect oscillations in a broad frequency region. With a piezoelectric measured-value sensor in particular facet structures with re-contacting can be well realized. As they are able to detect different forces, different forms of embodiment of the vehicle sensor can be realized simply and cost-efficiently by means of piezoelements.

On the other hand, the measured-value sensor can also be embodied as a piezoresistive or capacitive measured-value sensor. With a measured-value sensor of this type pressure forces can be well detected. They have a fine spatial resolution. Particularly array arrangements can be well realized with a measured-value sensor of this type. The electronics of the processing unit can be integrated into the array structure. Preferably, the vehicle sensor is then embodied as ASIC, the contacting of the measured-value sensing elements being realized within the ASIC.

Furthermore, the sensor can have a carrier for the measured-value sensor, which is embodied as a substrate, a wiring carrier or a foil. Preferably, the carrier may be suitable for further assembly in a housing. If used on technologies based on semi-conductors, in particular of custom-designed circuits, the carrier can be a lead frame, which is filled with a moulding mass to form a housing.

Preferably, the measured-value sensor is connected to the carrier via a force-fit and/or positive-fit connection. This connection is for instance a glued spot or a contact layer. It may have contact surfaces, which ensure electric signal transmission between the electrodes of the measured-value sensor and a processing unit arranged on the carrier.

As a protection against environmental influences the sensor can have a housing. In a preferred form of embodiment of the vehicle sensor the housing is formed as a hybrid housing. The housing of the vehicle sensor can be formed such that it can be fit into a hollow space of the vehicle structure and that it can be fastened there via a glue-, solder-, weld-, clamp- or screw-connection. The hollow space can additionally be filled with a grouting. Alternatively it is also possible that the housing is fastened at the vehicle structure via an assembly block, which accommodates the vehicle sensor together with the housing.

The vehicle sensor can also comprise an acceleration sensor to detect accelerations with high precision. The acceleration sensor is preferably realized as a piezoelectric or micromechanical acceleration sensor.

Based on the different fields of application of the vehicle sensor in the vehicle and of the different amplitudes of the signal portions of the longitudinal or transversal impact sound or of the acceleration it is advantageous, if the sensitivity of the acceleration measurement in the manufacturing process of the vehicle sensor depending on the application is adjusted differently in a region of approx. ±1 g to approx. ±1000 g. Therewith an overmodulation of a processing unit integrated into the vehicle sensor can be prevented. A higher sensitivity of up to approx. ±1000 g can be adjusted if, the vehicle sensor is to be used for example in the frontal region of the vehicle to detect a frontal crash. But also a collision with a passenger, who has a smaller mass compared to another vehicle, can then safely be detected for example to trigger a passenger protection system.

Furthermore, the vehicle sensor can be embodied such that the measured-value sensing elements are coupled to the vehicle structure via at least one mechanical contact point for transmission of the impact sound waves. In this case the at least one mechanical contact point can be cone-shaped, the base area of the cone being circular or oval. If the vehicle sensor is additionally connected via an assembly block to the vehicle structure, also the fastening surfaces between the assembly block and the vehicle structure can comprise such contact points. Preferably, the cone is arranged such that its base area is connected to the measured-value sensor or if necessary to the assembly block, which contains the vehicle sensor, whereas the apex is connected to the vehicle structure. By means of this, attenuation of undesired signals or a preferred transmission of desired signals in relation to undesired signal portions is made possible.

If the vehicle sensor is used for example to detect a motion sequence of a vehicle, the distances between the mechanical contact points should be smaller than the smallest wave length to be detected.

If the vehicle sensor is used for example as a wave filter, the distances between the mechanical contact points should be greater than the greatest wave length to be detected.

The invention further relates to a safety device for a vehicle with at least one vehicle sensor according to the invention. With only one vehicle sensor one level can be monitored with regard to a crash and the safety device can be triggered in time and reliably subject to the type of the accident.

Moreover, the invention relates to a diagnostic device for a vehicle with a least one vehicle sensor according to the invention. Diagnostic devices of this type can comprise for example recognition apparatuses for crash signatures, stock damages, brake wear, roadbeds, combustion abnormities, or drone noises. In this way, based on measurements of the oscillation at the relevant places, it can perform for example monitoring of a ball bearing or roller bearing. It can also realize monitoring of the roadbed state based on an oscillation analysis of the oscillations appearing in the chassis. It further can be used in stability and brake systems of the vehicle or in control systems of the driving dynamics. The vehicle sensor with its characteristic sensitivity direction is mounted in this case in accordance with the alignment of the oscillations to be measured.

Further, the invention relates to the use of a vehicle sensor according to the invention for evaluating superimposed impact sound waves, which are independent from each other, or for differentiating between superimposed impact sound waves, which are independent from each other, as a variable band pass and/or effective value creator or as a parameter estimator or for the determination of statistic characteristics.

It has shown that with more than eight measured-value sensing elements it is possible to perform an evaluation of superimposed independent waves or a differentiation between superimposed independent waves.

By evaluating superimposed independent waves or differentiating between superimposed independent waves for example determination of the origin of the impact sound wave or positioning of the signal source can be made possible. An evaluation of the direction of occurring impact sound waves can be used advantageously when realising a passenger protection system, in order to detect for example the place of the collision with an obstacle and to be able to therewith control the passenger protection system with higher precision.

Furthermore, a spectral analysis of the impact sound waves and in particular a FFT (Fast Fourier Transformation) and or short-time-FFT can be effected therewith. With this the implementation of a safety device in a vehicle can be realized with a possibly low number of vehicle sensors.

Moreover, further possible fields of application of the vehicle sensor can result. By evaluating superimposed independent waves or differentiating between superimposed independent waves an amplitude demodulation and/or frequency demodulation of measurement signals can be made possible. Further with these properties different filter functions can be reproduced.

Further advantages and fields of application of the present invention will become apparent from the ensuing description in connection with the examples of embodiment shown in the drawings.

In the description, the claims and the abstract and in the drawings those terms and associated reference numerals are used, which are used in the list added below.

BRIEF DESCRIPTION OF THE DRAWINGS

The drawings show in:

FIG. 2.2 a frequency characteristics of the signal detected by the vehicle sensor of FIG. 2.1;

FIG. 4.1 a detailed representation of the mounting of the measured-value sensor onto a carrier of the first form of embodiment shown in FIG. 3;

FIG. 4.2 a larger scale view of a section of FIG. 4.1 defined by a punctured circle;

FIG. 4.3 the representation of a cut of FIG. 4.1 following the line A-B;

FIG. 5.1 a facet arrangement of the measured-value sensing elements;

FIG. 5.2 an array arrangement of the measured-value sensing elements;

FIG. 6.1 a digital arrangement of the measured-value sensing elements;

FIG. 6.2 a self-testing arrangement of the measured-value sensing elements;

FIG. 9.1 a third form of embodiment of the vehicle sensor according to the invention;

FIG. 9.2 the representation of a cut of FIG. 9.1 following the line A-B;

FIG. 10.1 a representation of the coupling of the measured-value sensing elements to the vehicle structure by means of the visco-elastic coupling layer;

FIG. 10.2 a representation of the coupling of the measured-value sensing elements to the vehicle structure by means of the visco-elastic nubs;

FIG. 10.3 a representation of the coupling of the measured-value sensing elements to the vehicle structure by means of recesses of a matrix filled with visco-elastic material;

FIG. 11.1 different forms of embodiment of the nubs and the recesses of the matrix, resp.;

FIG. 11.2 a representation of the coupling of the measured-value sensing elements to the vehicle structure with an adaptation of the wave to the measured-value sensing element;

DETAILED DESCRIPTION OF THE DRAWINGS

Figure 12:
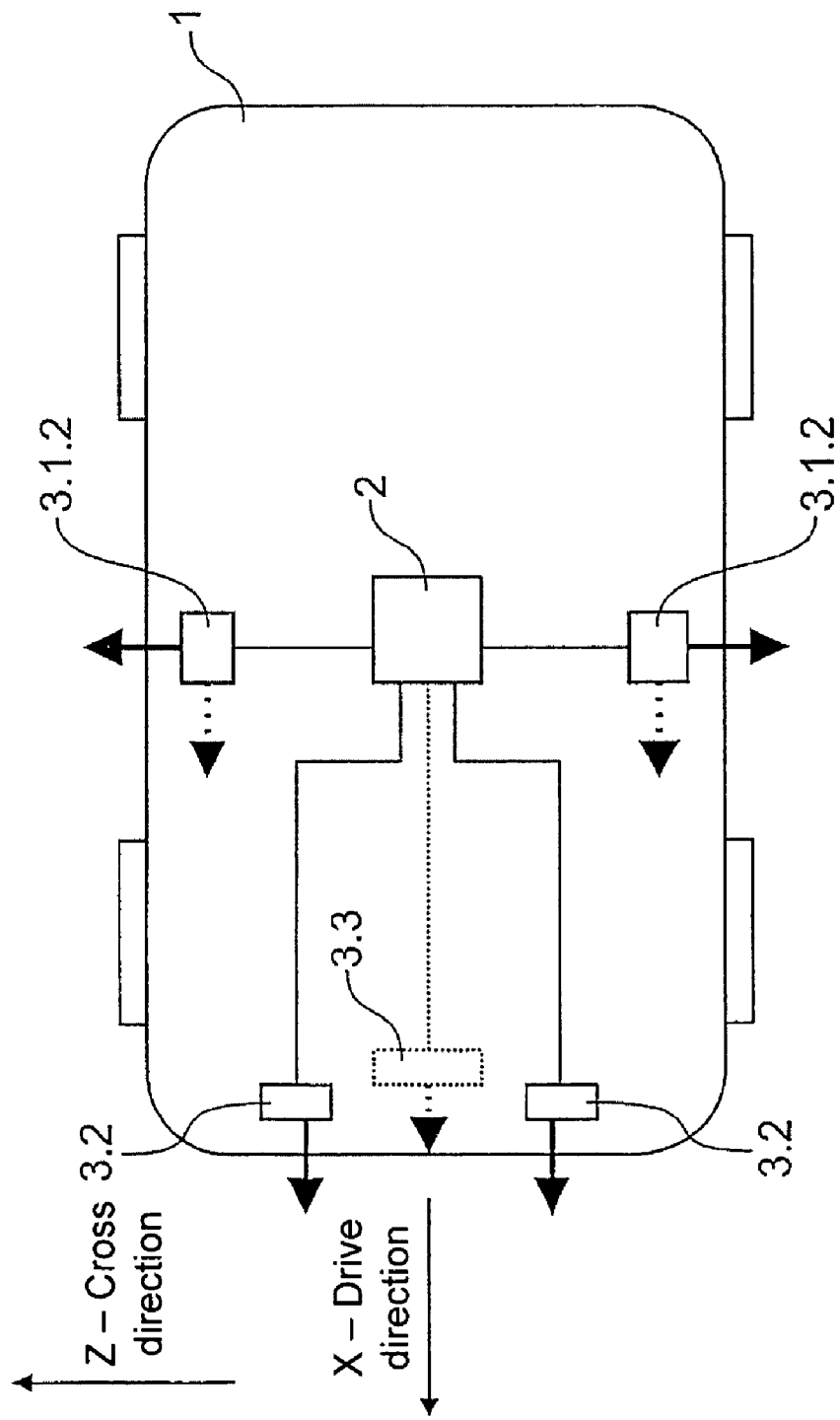
FIG. 12 a realization of a passenger protection system with lateral and upfront sensors according to the state of art.

FIG. 12 shows a realization of a passenger protection system with lateral and upfront sensors according to the state of art. The vehicle 1 is equipped with a central control device 2, which is provided for controlling or triggering a safety device in the vehicle 1. Furthermore, a number of sensors (3.1.2, 3.2, 3.3) is arranged in the vehicle, which are provided for a fast detection of a frontal or lateral crash.

The control device 2 is arranged centrally in the vehicle 1, preferably in the vehicle tunnel. It controls for example the triggering of passenger protection systems not shown in detail such as belt tensioners, airbags or roll appliances, which must be activated at the correct point in time during or after a collision to grant highest possible protection for the passenger.

The sensors arranged at the sides of the vehicle 1 are lateral sensors 3.1.2, which serve for recognizing a side crash. The sensitivity of the lateral sensors 3.1.2 is usually aligned to the y-direction, i.e. in transversal direction to the vehicle. Also apparatuses are known, in which the lateral sensors 3.1.2 have an additional sensitivity to the x-direction, i.e. in the longitudinal direction of the vehicle, as it is shown in FIG. 12 with a dotted arrow. The additional acceleration sensors in the longitudinal direction of the vehicle are mainly provided for detecting crashs, which appear in the region of the fender of the vehicle 1, that means not centrally from the front or back. These crashs are difficult to be detected, as the body of the vehicle 1 is relatively soft in the region of the fenders and, therefore, a crash is recognized relatively late in time.

The sensors arranged in the front region of the vehicle are centrally arranged upfront sensors 3.3 and laterally arranged upfront sensors 3.2. They are used for detecting a frontal crash. Depending on the requirements of the passenger protection system to be triggered two laterally arranged upfront sensors 3.2 or only one centrally arranged upfront sensor 3.3 can be necessary to reliably detect a crash and to safely trigger the passenger protection system. The sensitivity direction of the upfront sensors 3.2, 3.3 is aligned to the x-direction, i.e. to the longitudinal direction of the vehicle.

The lateral sensors 3.1.2 and the upfront sensors 3.2, 3.3 are mounted as close as possible to the vehicle body shell, to be able to detect for example also accidents with pole-shaped obstacles. In case of such accidents a safe detection is problematic due to the fact that the amplitude of the measured acceleration signal is relatively low. Also with side crashs the arrangement of the sensors close to the vehicle body shell is essential, to fast and safely trigger the passenger protection system, as the deformable zone at the side of the vehicle is small.

Figure 13:
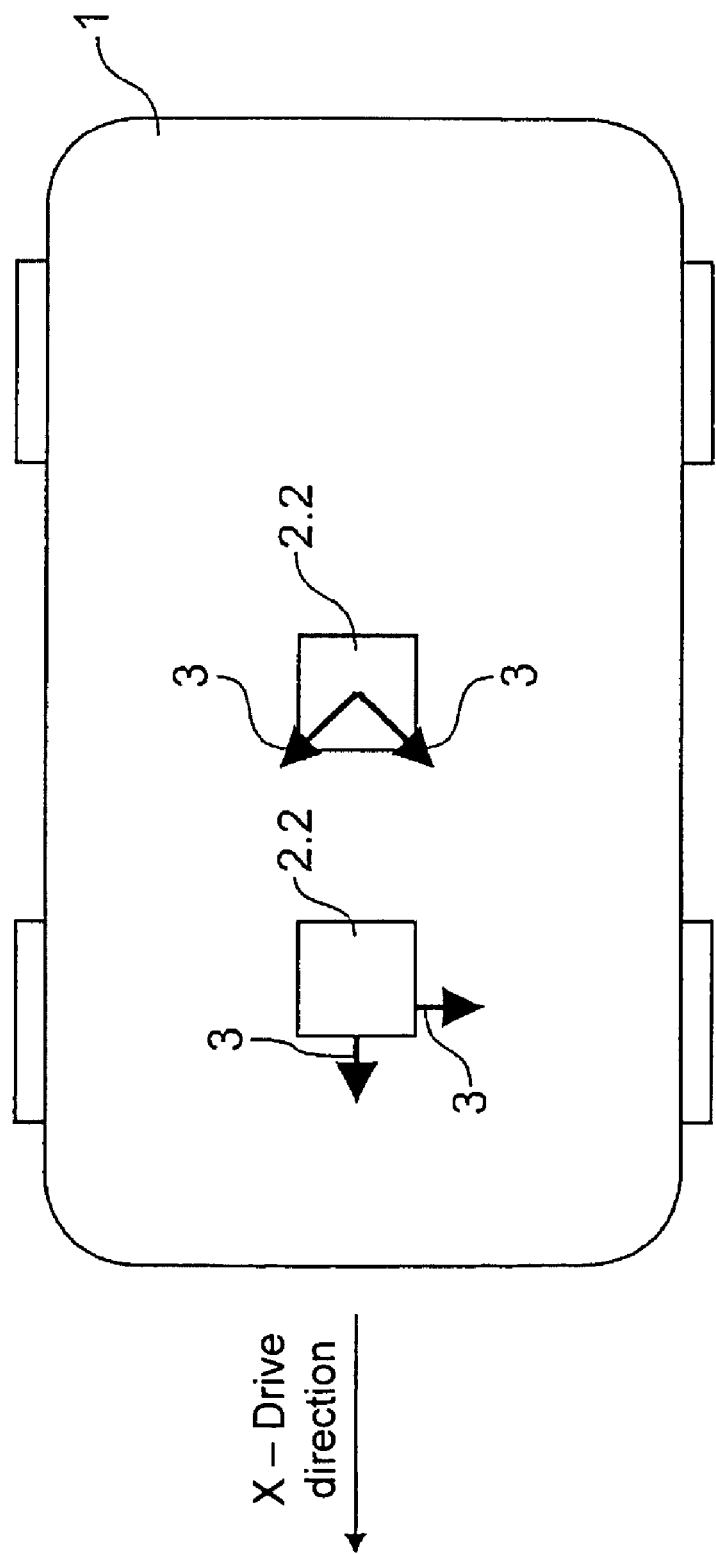
FIG. 13 a representation of the sensitivity direction of acceleration sensors of a passenger protection system according to the state of art.

FIG. 13 shows a representation of the sensitivity directions of acceleration sensors of a passenger protection system according to the state of art. Here, the control device 2.2 has two acceleration sensors, whose sensitivity directions 3 are each staggered by 90°. In the first case, which is shown on the left, the sensitivity of the first acceleration sensor is aligned to the x-direction, i.e. in the direction of the vehicle longitudinal axis, whereas the sensitivity of the second acceleration sensor is aligned to the y-direction, i.e. in direction of the vehicle transversal axis. In the second case, which is shown on the right, the sensitivities of the first and second acceleration sensor are aligned each staggered by 45° to the vehicle longitudinal axis. The acceleration sensors can be arranged in each imaginable angle position, to be able to monitor on the basis of the resulting acceleration vectors one level with regard to a change of acceleration.

Figure 1:
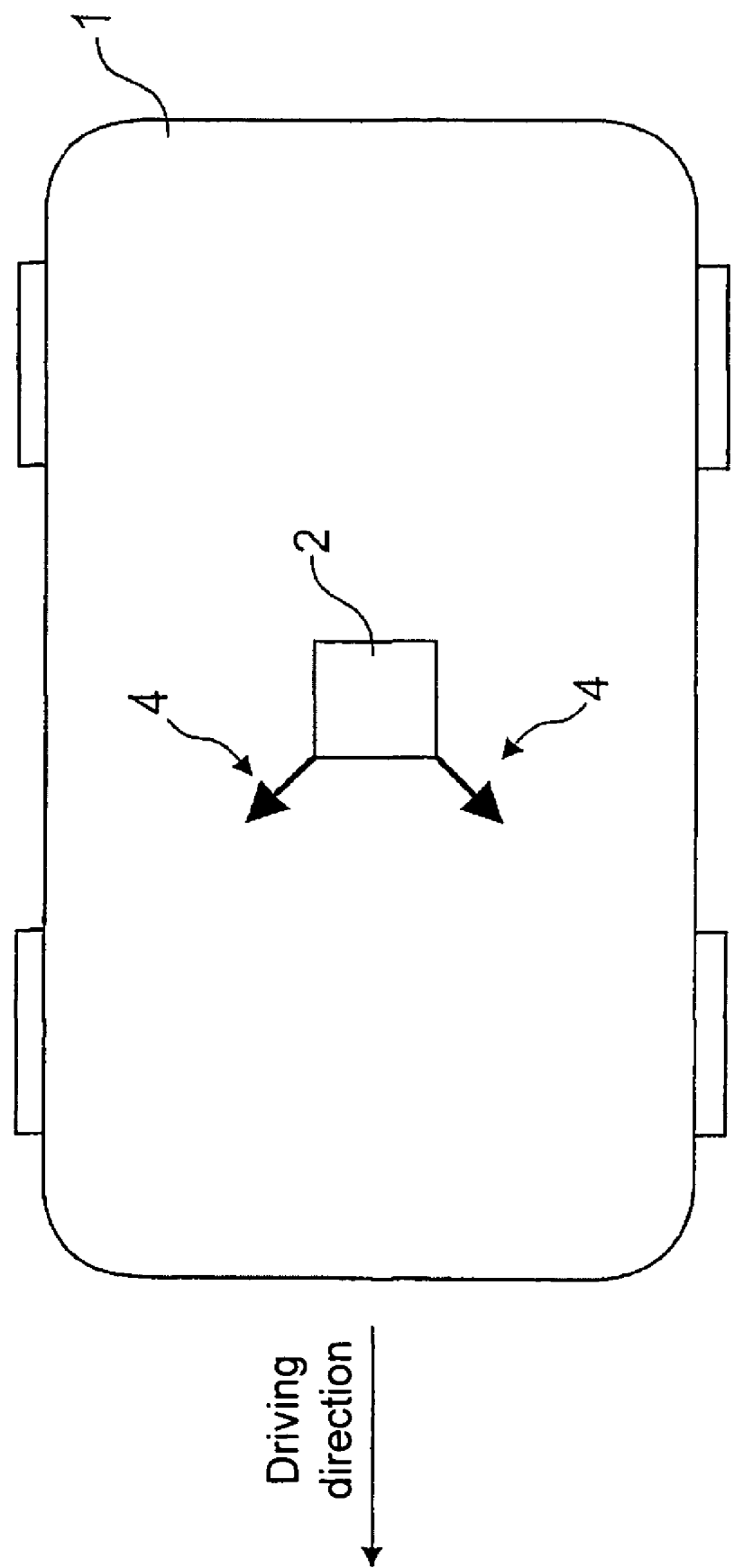
FIG. 1 a realization of a passenger protection system with two vehicle sensors according to the invention.

FIG. 1 shows a realization of a passenger protection system with two vehicle sensors 4 according to the invention. The mounting of the vehicle sensors 4 directly at the vehicle body shell is not required due to their functionality. They are arranged close to or within the centrally arranged control device 2.

As transversal as also longitudinal impact sound waves propagate faster in the vehicle than the oscillations created by a change in acceleration, mounting of the vehicle sensors 4 at the vehicle body shell is not essential, as also when mounted in protected hollow spaces of the vehicle or close to or within the control device 2, an accurately timed triggering of the passenger protection system can be ensured.

As the vehicle sensor 4 can comprise according to the invention a direction characteristics in x- and y-direction, whose resulting direction characteristics is shown by an arrow, it is possible to monitor with only one vehicle sensor 4 a surface formed by the longitudinal axis and transversal axis of the vehicle with regard to a detection of an accident. For an increase of safety when triggering a passenger protection system, a plausibility of the trigger signal for the passenger protection system is effected by means of a second vehicle sensor 4, whose resulting direction characteristics is staggered by 90° towards that of the first vehicle sensor 4. As an alternative, a plausibility of the trigger signal can also be effected by using a further signal portion, e.g. that of the acceleration, of the same vehicle sensor 4.

Attaching a further vehicle sensor 4 for example close to the vehicle body shell in addition to the vehicle sensor 4 centrally arranged in the control device, although the latter is able to monitor a surface formed by the longitudinal axis and transversal axis of the vehicle, is required for example in the case a collision with a lightweight obstacle is to be detected.

Figure 2:
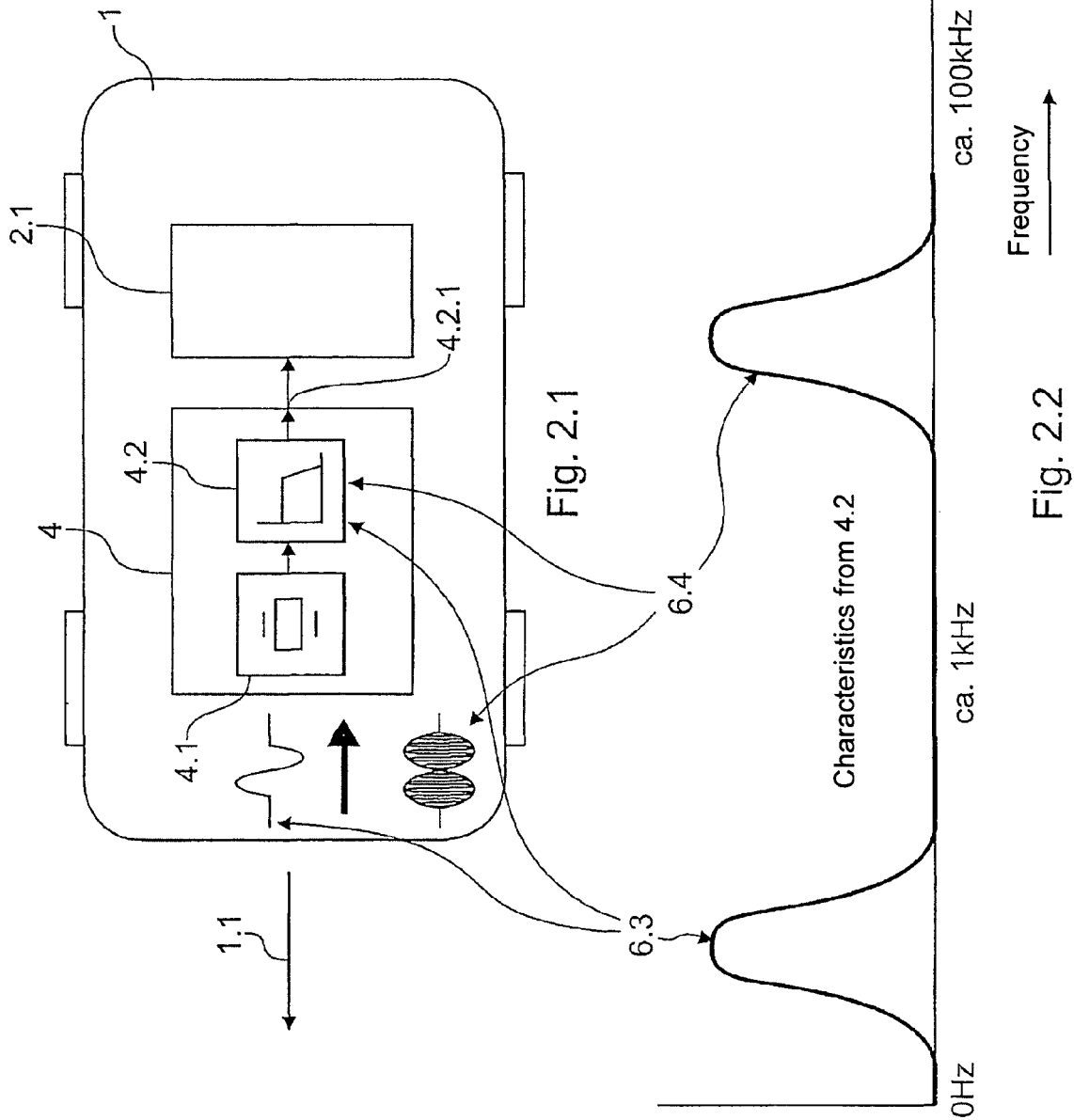
FIG. 2.1 a schematic representation of the vehicle sensor according to the invention, the vehicle sensor detecting also the acceleration in addition to the impact sound.

FIG. 2.1 shows a schematic representation of the vehicle sensor 4 according to the invention, wherein the vehicle sensor 4 detects also the acceleration below 500 Hz in addition to the impact sound above 4 kHz. FIG. 2.2 shows a frequency characteristics of the signal detected by the vehicle sensor 4 shown in FIG. 2.1. The vehicle sensor 4 is arranged in a vehicle 1, which moves towards the driving direction 1.1. It comprises a measured-value sensor 4.1 for detecting the impact sound above 4 kHz and the acceleration below 500 Hz and a processing unit 4.2.

The processing unit 4.2 comprises an integrated amplifying circuit, which pre-processes the measurement signals of the impact sound 6.4 and the acceleration 6.3 for further processing in the subsequent evaluation unit 2.1. In this case the evaluation unit 2.1. is a microprocessor of the control device 2 for a passenger protection system. Pre-processing of the measurement signals of the impact sound 6.4 and the acceleration 6.3 comprise filtering and digitalisation of the filtered signals by an A/D-converter, so that they apply as a digital signal to the output 4.2.1 of the processing unit 4.2. The signals produced in this way are then supplied to the microprocessor in the control device 2 via a digital interface. Moreover, in this way an additional expensive external signal filtering is inapplicable. For preventing an overmodulation of the processing unit 4.2 the sensitivity of the vehicle sensor with regard to an acceleration between ±1 g and ±1000 g is chosen such that it complies with the requirements of the vehicle sensor use, without too high amplitude differences of the various signal portions occurring.

Figure 3:
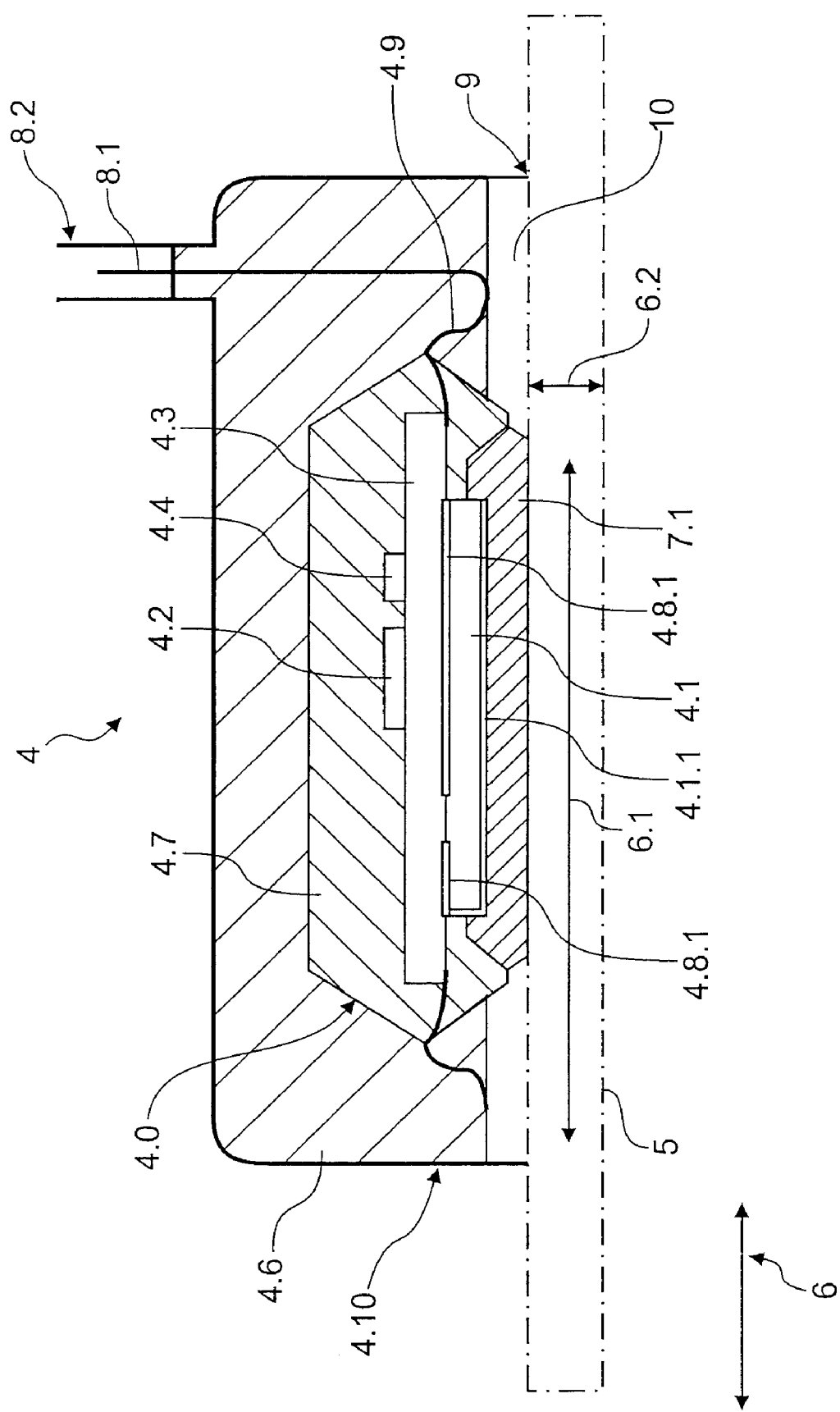
FIG. 3 a first form of embodiment of the vehicle sensor according to the invention.

FIG. 3 shows a first form of embodiment of the vehicle sensor 4 according to the invention, which is mounted on the vehicle structure 5. In the vehicle structure 5 the impact sound waves propagate in direction 6, wherein they divide into longitudinal impact sound waves 6.1 and transversal impact sound waves 6.2. Longitudinal impact sound waves 6.1 swing in the direction of propagation of the impact sound wave 6, whereas transversal impact sound waves 6.2 swing vertically to the direction of propagation of the impact sound wave 6.

As a carrier 4.3 the vehicle sensor 4 comprises a substrate. This substrate can be a ceramic, an enamel or a printed circuit board substrate. By means of a contacting layer 4.8.1 as a force-fit connection a piezoelement is fastened to the carrier 4.3 as a measured-value sensor 4.1. On the opposite surface of the carrier 4.3 an integrated circuit is arranged as a processing unit 4.2. In addition a micromechanical acceleration sensor 4.4 can be arranged. The carrier 4.3, the processing unit 4.2 and the acceleration sensor 4.4 as well as the lead frame 4.9, which serves for contacting, are injection-moulded with a mould mass 4.7 to form the sensor body 4.0. The contacts of the lead frame 4.9 of the sensor body 4.0 are connected with the plug pins 8.1, which form the connector plug 8.2. The sensor body 4.0 is fastened in the housing 4.10 and is filled with a grouting 4.6. The housing 4.10 does not completely surround in this case the sensor body 4.0 and the grouting 4.6.

To ensure a transmission of the signals of the impact sound and of the acceleration, between the piezoelectric layer 4.1 with an electrode 4.1.1 applied thereon and the vehicle structure 5 an elastic coupling layer 7.1 is applied, which is embodied to effect attenuation of undesired signal portions and to preferably transmit desired signal portions, respectively.

The elastic contacting layer 4.8.1 between the carrier 4.3 and the piezoelectric layer 4.1 enables an electric signal transmission at one or more contact points to the contacts of the lead frame and thus to the connector plug 8.2. By detecting a potential or the change of the potential between the electrode 4.1.1 and a further electrode, which is arranged at the other side of the piezoelectric layer 4.1 and is not shown in detail, forces acting upon the piezoelectric layer 4.1 can be measured.

The mould mass 4.7 forms a protection for the carrier 4.3 and the piezoelectric layer 4.1 connected thereto, the processing unit 4.2 and the accelerating sensor 4.4. The shape resulting therefrom of the sensor body 4.0 offers a mounting aid for the carrier 4.3, which comprises the piezoelectric element 4.1, in the subsequent processing step, in which the sensor body 4.0 is poured into the sensor housing 4.10 by means of the grouting 4.6.

The vehicle sensor 4 is attached to the vehicle structure 5 with the open side of the housing 4.10 or with the side, at which the elastic coupling layer 7.1 is located. For this purpose the housing 4.10 is fastened by means of a glued joint as a circumferential junction point 9 to the vehicle structure 5 such that the elastic coupling layer 7.1 applies directly to the vehicle structure 5 for transmitting the signals of impact sound and of acceleration. For reasons of tolerances e.g. in manufacturing, a hollow space 10 remains in the region of the housing outer wall. In the region of the piezoelectric layer 4.1 the elastic coupling layer 7.1 provides for the required tolerance balance and thus for an optimal contact and optimal transmission of the signals between the piezoelectric layer 4.1 and the vehicle structure 5.

The circumferential junction point 9 can alternatively be embodied also as a weld- or solder-connection. In addition, it can further be reinforced by a mechanical connection such as a clamp connection or a screwing, which is not shown here. This can be advantageous for example in the assembly process, if waiting times for drying of the glued joint are to be avoided.

FIG. 4.1 shows a detailed representation of the mounting of the piezoelectric layer 4.1 onto the carrier 4.3 of the first form of embodiment shown in FIG. 3. Beneath the piezoelectric layer 4.1 the mutual electrode 4.1.1 is fixed, which left-sided leads around the piezoelectric layer 4.1 up to the top, in order to rest with a smaller partial surface between the piezoelectric layer 4.1 and the elastic contacting layer 4.8.1. Above from the piezoelectric layer 4.1 or between the piezoelectric layer 4.1 and the elastic contacting layer 4.8.1 a further electrode 4.1.2 is attached, which according to the invention can be divided in several electrodes, which corresponds to a division of the measured-value sensor into individual measured-value sensing elements. The carrier 4.3 comprises two through platings 4.3.1, which enable establishing of a connection between the two electrodes 4.1.1 and 4.1.2 and the processing unit 4.2.

FIG. 4.2 shows a larger scale view of the section of FIG. 4.1 defined by a punctured circle and the contacting of the mutual electrode 4.1.1, respectively. The mutual electrode 4.1.1 is lead left-sided around the piezoelectric layer 4.1. Therewith it is connected to the elastic contacting layer 4.8.1 by a smaller partial surface. Via a contact surface 4.3.2 and a wiring line 4.3.3, which is connected by the through plating 4.3.1, the mutual electrode 4.1.1 is electrically connected to the processing unit 4.2. The contact surface 4.3.2 is clearly smaller than the elastic contacting surface 4.8.1, so that a connection between the elastic contacting layer 4.8.1 and the carrier 4.3 is ensured.

FIG. 4.3 shows the representation of a cut of FIG. 4.1 following the line A-B and with it the division of the surface of the electrode 4.1.2 and the smaller partial surface of the mutual electrode 4.1.1. The mutual electrode 4.1.1 was lead around the piezoelectric layer 4.1 to enable an electric connection to the processing unit 4.2 by the above-described electric signal path. By dividing the surface of the electrode 4.1.2, the electrode 4.1.2, which is shown in this case as an individual electrode, can be divided depending on the purpose of application of the vehicle sensor 4 into several individual electrodes, which corresponds to a division into several measured-value sensing elements.

FIGS. 5.1, 5.2, 6.1, 6.2 also show cuts of FIG. 4.1 following the line A-B, wherein the piezoelectric layer 4.1 and analogous thereto also the electrode 4.1.2 have been divided into different arrangements.

FIG. 5.1 shows a facet arrangement of the meter electrodes 4.1.3, which corresponds to a facet arrangement of the measured-value sensing elements. The meter electrodes 4.1.3 are embodied as fixed components of the measured-value sensor 4.1. The mutual electrode 4.1.1 serves for each meter electrode 4.1.3 to detect the potential difference of the piezoelectric layer between the respective electrode 4.1.3 and the mutual electrode 4.1.1. Analogous thereto FIG. 5.2 shows an array arrangement of the meter electrodes 4.1.4, which corresponds to an array arrangement of the measured-value sensing elements.

Facet or array arrangements comprise a two-dimensional structure, i.e. at least some of the individual measured-value sensing elements comprise an offset in X- and Y-direction to each other. In the concrete case of FIGS. 5.1 and 5.2 a line & column structure was selected, wherein at least two lines and two columns each consist of two measured-value sensing elements. The measured-value sensing elements can also be arranged in the surface elsewhere staggered in space.

By evaluating the differences in amplitude and run time the direction of the collision can be recognized from the signals of the individual measured-value sensing elements.

By means of preferably greater than or equal to 8 meter electrodes one level can be monitored safely with regard to the impact sound and the origin of the impact sound wave can be determined. Besides, by means of more than 8 meter electrodes an evaluation of superimposed independent waves or a differentiation between superimposed independent waves is possible.

On the other hand, FIG. 6.1 shows a digital arrangement of the meter electrodes 4.1.5, which corresponds to a digital arrangement of the measured-value sensing elements. By means of such a comb-like embodiment of the two measured-value sensing elements and of the two meter electrodes 4.1.5, respectively, filter characteristics of the vehicle sensor can be realized. In addition to the mutual electrode 4.1.1 at least two of such comb-like formed measured-value sensing elements are necessary to embody a filter characteristics for longitudinal impact sound waves of the vehicle sensor. Furthermore, also with this arrangement the geometrical arrangement and the geometrical dimensions of the measured-value sensing elements and of the meter electrodes, resp., affect the signal transmission of the impact sound waves.

FIG. 6.2 shows an arrangement of the electrodes according to FIG. 4.3, wherein a self-testing electrode 4.1.6 has been added to the mutual electrode 4.1.1 and the electrode 4.1.2. Also in other mentioned examples of embodiment for the arrangement of meter electrodes (FIG. 5.1, 5.2, 6.1) this self-testing electrode 4.1.6 can be added to the meter electrodes 4.1.*x* shown there, to implement a self-testability of the vehicle sensor 4. Via the self-testing electrode 4.1.6 a test signal is supplied, which due to a coupling via the piezoelectric layer is measured by the electrode 4.1.2. Analogous thereto in case of implementation of a self-testing electrode in the other shown examples of embodiment for the arrangement of measured-value sensing elements and meter electrodes (FIG. 5.1, 5.2, 6.1), resp., this test signal can be measured by the meter electrodes 4.1.*x* shown there.

Figure 7:
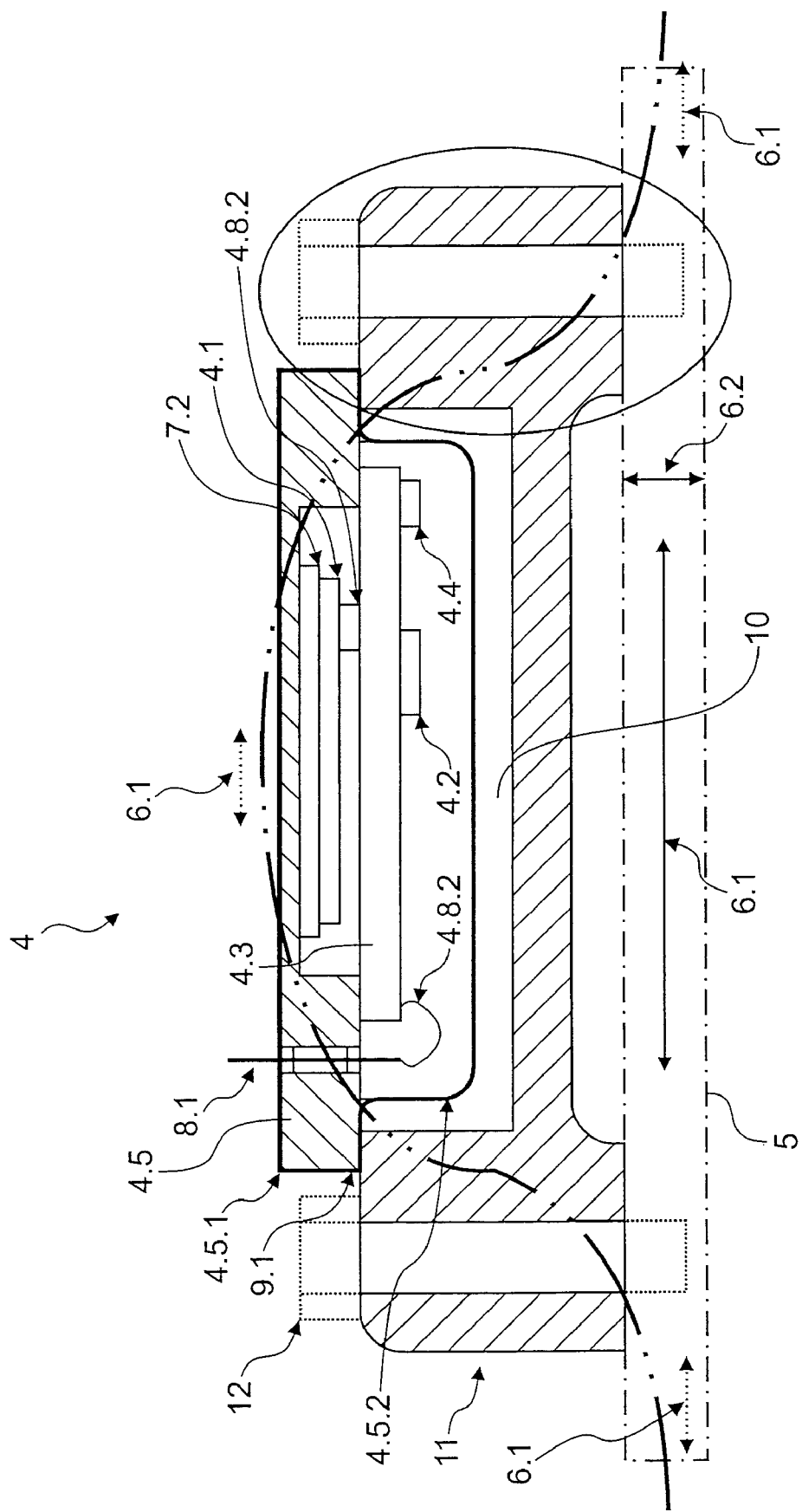
FIG. 7 a second form of embodiment of the vehicle sensor according to the invention.

FIG. 7 shows a second form of embodiment of the vehicle sensor 4 according to the invention, which is mounted on a vehicle structure 5. Analogous as described in FIG. 3, the vehicle sensor 4 has a substrate as a carrier 4.3. Below the carrier 4.3 the processing unit 4.2 is arranged. Also below the carrier 4.3 an acceleration sensor 4.4 can be arranged. Above from the carrier 4.3 a piezoelectric layer with meter electrodes is connected as a measure-value sensor 4.1 to the carrier 4.3 via a glued point 4.8.3. As for the signal the measured-value sensor 4.1 is coupled and connected to the hybrid housing floor 4.5.1 via the visco-elastic coupling layer 7.2. Below the carrier the hybrid housing lid 4.5.2 closes the vehicle sensor 4.

Via the bond connections 4.8.2 the measured signals delivered by the processing unit 4.2 are forwarded to the plug pins 8.1 and are lead towards outside. The plug pins 8.1 are formed as glass ducts of the hybrid housing floor.

The hybrid housing 4.5 is fastened to an assembly block 11 by means of a glued joint 9.1. Alternatively, the hybrid housing can also be fastened to the assembly block 11 via a weld- or solder-connection. The fastening can, as it is not shown here, be reinforced for example by a screw connection. The assembly block 11 comprises a suitable hollow space 10 to accommodate the vehicle sensor 4 in its hybrid housing 4.5. The assembly block 11 is fastened by a screw connection 12 to the vehicle structure 5. In addition, the fastening can be reinforced by a glue-, weld- or solder-connection, which is not shown in detail here.

The impact sound waves propagate longitudinal to the vehicle structure in direction 6, wherein they divide into transversal impact sound waves 6.2 and longitudinal impact sound waves 6.1. The assembly block 11 and the hybrid housing 4.5 are fastened such that they ensure a transmission in particular of the longitudinal impact sound waves, as is shown in chain line. Via the visco-elastic coupling layer 7.2 the impact sound waves are further transmitted to the piezoelectric layer 4.1. In this way, the vehicle sensor is coupled with regard to the signal to the vehicle structure 5.

The hybrid housing 4.5 forms a protection, for example against humidity, for the carrier 4.3 with the measured-value sensor 4.1, the processing unit 4.2 and the acceleration sensor 4.4. It is embodied such that it can be easily added into the hollow space 10 of the assembly block 11 and filled with a grouting. The assembly block 11 has a shape, which effects the required tolerance balance when being mounted between the vehicle sensor and vehicle structure.

As an alternative one can renounce on the assembly block 11, if the vehicle structure 5 comprises a recess similar to the hollow space 10 of the assembly block 11 to accommodate the hybrid housing 4.5.

Figure 8:
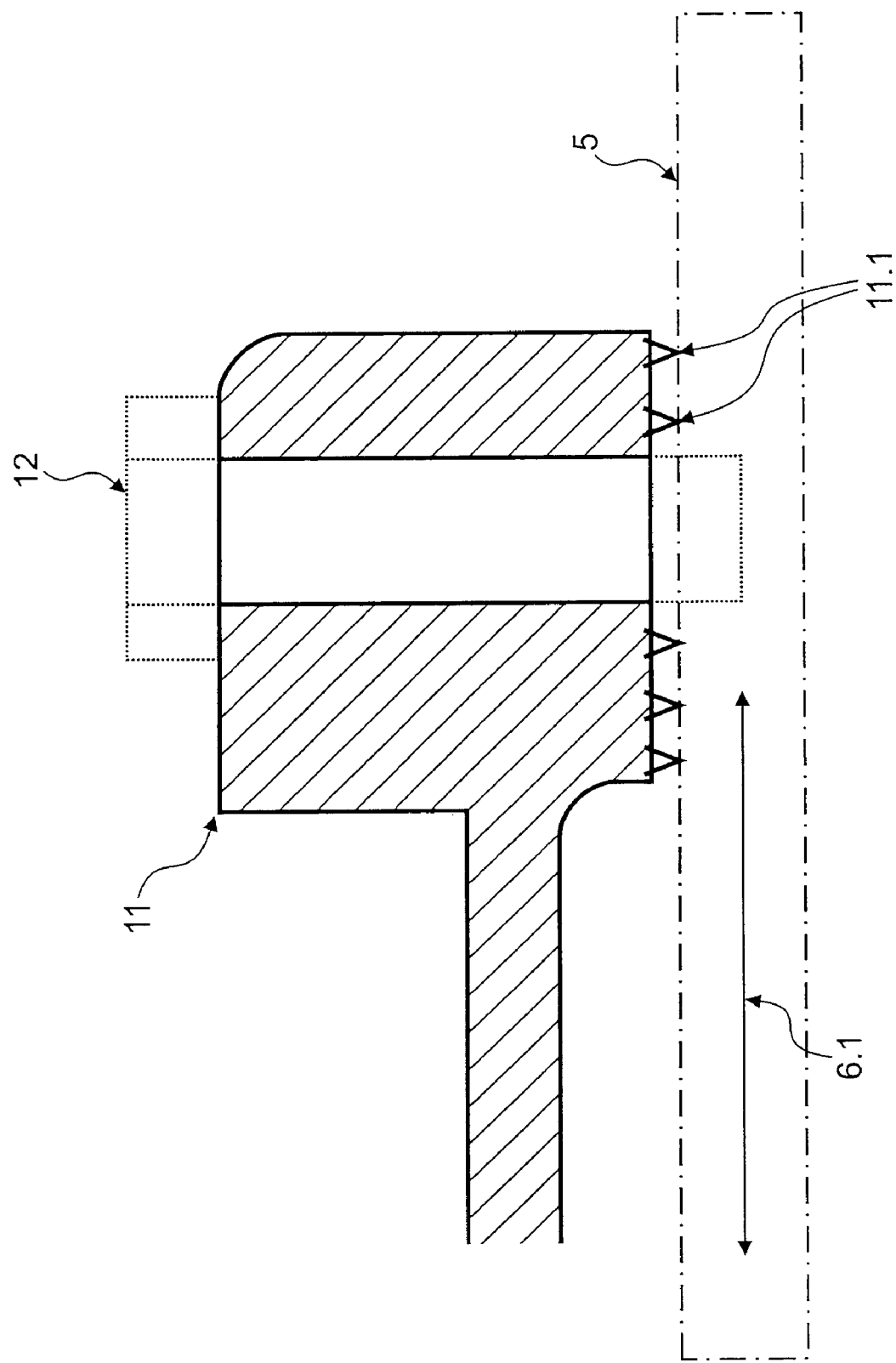
FIG. 8 a larger scale view of a section of FIG. 7 defined by a circle.

FIG. 8 shows a larger scale view of a section of FIG. 7 defined by a circle. In detail, it shows mounting of the assembly block 11 to the vehicle structure 5. The assembly block 11 is fastened to the vehicle structure 5 by a screw connection 12. In addition, the fastening is reinforced by mechanical contact points 11.1.

The mechanical contact points 11.1 are cone-shaped with a circular base area. Alternatively, also contact points are possible, whose cone has an oval base area. Depending on the geometrical dimensions and the geometrical arrangement of these contact points 11.1 a preferred transmission of desired signal portions such as that of the longitudinal impact sound 6.1 from the vehicle structure 5 to the assembly block 11 and an attenuation of undesired signal portions is achieved.

With regard to the geometrical dimensions of the mechanical contact points 11.1 or of the distances of the mounting of the mechanical contact points 11.1 it applies here also that dependent on the application of the vehicle sensor they are dependent on the wave length to be detected of the impact sound.

FIG. 9.1 shows a third form of embodiment of the vehicle sensor 4 according to the invention. Also in this case the vehicle sensor 4 comprises a carrier 4.3, which comprises on the one side a processing unit 4.2 and an acceleration sensor 4.4 and which is connected on the other side to a piezoelement 4.1 via a glued joint 4.8.3. The signals measured by the piezoelement 4.1 are lead to the processing unit via a through plating 4.3.1. Via the bond connections 4.8.2 the signals processed by the processing unit 4.2 are forwarded towards the outside to the plug pins 8.1. Also in this case the plug pins 8.1 are embodied as glass ducts in the hybrid housing 4.5. In this form of embodiment the hybrid housing 4.5 completely surrounds the above-mentioned components of the vehicle sensor 4. The hybrid housing 4.5 is fastened to the vehicle structure 5 by means of a glued joint 9.1.

Other than with the first and the second form of embodiment the piezoelement 4.1 is arranged at right angles to the carrier 4.3. By means of this an attenuation of the transversal impact sound waves 6.2 is achieved.

For a better understanding FIG. 9.2 shows the representation of a cut of FIG. 9.1 following the line A-B. The detection of the longitudinal impact sound waves 6.1 is made possible by the fact that the piezoelement 4.1 together with its mutual electrode 4.1.1 is connected via a rigid coupling 7.3 to the hybrid housing 4.5 and the hybrid housing 4.5 in turn is connected by a grouting or a visco-elastic coupling layer 7.2 to the vehicle structure 5. The rigid coupling 7.3 and the visco-elastic coupling layer 7.2 permit on the one hand the preferred transmission of desired signal portions as well as an attenuation of undesired signal portions.

The glued joint 4.8.3 between the carrier 4.3 and the piezoelement 4.1 is embodied with at least one wiring line 4.3.3, to realize the electric signal transmission between the mutual electrode 4.1.1 and the through plating 4.3.1 and also the processing unit 4.2.

The hybrid housing 4.5 protects the vehicle sensor 4 for example against humidity, and it is embodied such that it can be easily fit into a suitable, circular hollow space 10 of the vehicle structure 5, that it can be connected to the vehicle structure 5 by means of the glued joint 9.1 and that it can be filled at least partially with the grouting 4.6 or the visco-elastic coupling layer 7.2. In addition, the hybrid housing can be fastened to the vehicle structure 5 by mechanical fixing such as a clamp- or a screw-connection. By the circular hollow space 10 in the vehicle structure 5, in addition the propagation of the transversal impact sound wave is impeded and thus an attenuation of this wave is achieved.

Alternatively, the vehicle sensor can be connected to the vehicle structure 5 via an assembly block similarly as described in the second form of embodiment. The shape of the vehicle sensor 4 and of its hybrid housing 4.5, resp., as well as the embodiment of the grouting 4.6 or of the elastic coupling layer 7.2 provide for the necessary tolerance balance when being mounted and for an optimal transmission of the impact sound and acceleration signals to the vehicle sensor 4.

FIG. 10.1 shows a representation of the coupling of the measured-value sensing elements 4.1.3 to the vehicle structure 5 by means of the visco-elastic coupling layer 7.2. The visco-elastic coupling layer 7.2 is formed as a mutual layer extending over all measured-value sensing elements 4.1.3.

FIG. 10.2 on the other hand shows a representation of the coupling of the measured-value sensing elements 4.1.3 to the vehicle structure 5 by means of visco-elastic nubs 7.2.1. The space between the nubs 7.2.1, which in this case have a flattened spherical shape, is filled with an underfiller material. In contrast to the visco-elastic material of the nubs 7.2.1 this material is hard and inflexible.

FIG. 10.3 shows a representation of the coupling of the measured-value sensing elements 4.1.3 to the vehicle structure 5 by means of recesses 7.2.3 of a matrix 7.2.4 filled with visco-elastic material. The measured-value sensor is connected to the vehicle structure 5 by means of a matrix 7.2.4. The matrix 7.2.4 comprises recesses 7.2.3 in the region of the measured-value sensing elements 4.1.3. These are filled with the visco-elastic material for signal coupling.

FIG. 11.1 shows different forms of embodiment of the nubs and the recesses of the matrix, resp. They differ with regard to their cross-section, which can be circular, rectangular or quadratic, and to their shape, which can be cuboidal or partially conical. Also their thickness or height can be different. Furthermore, they can additionally comprise recesses such as grooves or convexities, as is shown in the two right forms of embodiment of FIG. 11.1.

FIG. 11.2 finally shows a representation of the coupling of the measured-value sensing elements to the vehicle structure with an adaptation of the wave to the measured-value sensing element. By a suitable embodiment of the visco-elastic nub 7.2.1 it is possible to break a wave running through the vehicle structure such that can be optimally detected by the measured-value sensor element 4.1.3.

REFERENCE NUMERALS

1 Vehicle
1.1 Driving direction of the vehicle
2 Control device
2.1 Evaluation unit
2.2 Control device with acceleration sensor
3.1.2 Lateral sensors with direction sensitivity in x- and y-direction
3.2 Laterally arranged upfront sensor with direction sensitivity in x-direction 3.3 Centrally arranged upfront sensor with direction sensitivity in x-direction
4 Vehicle sensor according to the invention
4.0 Sensor body
4.1 Measured-value sensor
4.1.1 Mutual electrode of the measured-value sensor
4.1.2 Individual electrode of the measured-value sensor
4.1.3 Facet arrangement of the meter electrodes of the measured-value sensor
4.1.4 Array arrangement of the meter electrodes of the measured-value sensor
4.1.5 Digital arrangement of the meter electrodes of the measured-value sensor
4.1.6 Self-testing electrodes of the measured-value sensor
4.2 Processing unit
4.2.1 Output of the processing unit
4.3 Carrier
4.3.1 Through plating
4.3.2 Contact surface
4.3.3 Wiring line
4.4 Acceleration sensor
4.5 Hybrid housing
4.5.1 Hybrid housing floor
4.5.2 Hybrid housing lid
4.6 Grouting
4.7 Mould material
4.8.1 Elastic contacting layer
4.8.2 Bond connection
4.8.3 Glued spot
4.9 Lead frame
4.10 Housing
5 Vehicle structure
6 Direction of propagation of the impact sound wave
6.1 Direction of propagation of the longitudinal impact sound wave
6.2 Direction of propagation of the transversal impact sound wave
6.3 Acceleration signal portion
6.4 Impact sound signal portion
7.1 Elastic coupling layer
7.2 Visco-elastic coupling layer
7.2.1 Nubs made of visco-elastic material
7.2.2 Underfiller
7.2.3 Recesses of a matrix filled with visco-elastic material
7.2.4 Matrix
7.3 Rigid coupling
8.1 Plug pin
8.2 Connector plug
9 Circumferential junction point
9.1 Glued joint
10 Hollow space
11 Assembly block
11.1 Contact point
12 Fastening screw

The invention claimed is:

1. A vehicle sensor (4) for detecting impact sound, the sensor comprising:
 a measured-value sensor (4.1) for detecting the impact sound; and
 multiple individual, separate measured-value sensing elements (4.1.x), each of which is coupled to a vehicle structure (5) in such a way that impact sound waves are transmitted by the vehicle structure (5) to the measured-value sensing elements (4.1.x), wherein the measured-value sensing elements (4.1.x) are coupled to the vehicle structure (5) by an elastic (7.1) or a visco-elastic (7.2) coupling layer for transmitting the impact sound waves wherein a matrix is arranged between the measured-value sensing elements (4.1.x) and the vehicle structure (5), the matrix having recesses between the measured-value sensing elements (4.1.x) and the vehicle structure (5), and the visco-elastic coupling layer (7.2) is embodied in form of fillings (7.2.3) of the recesses.

2. A vehicle sensor according to claim 1, wherein the visco-elastic coupling layer (7.2) is formed as a mutual layer extending over the surface of all measured-value sensing elements (4.1.x) between the measured-value sensing elements (4.1.x) and the vehicle structure (5) or is embodied in form of separate nubs (7.2.1) between the measured-value sensing elements (4.1.x) and the vehicle structure (5).

3. A vehicle sensor according to claim 1, wherein the measured value sensor is a piezoelectric, piezoresistive or capacitive sensor and the individual, separate measured-value sensing elements are arranged at the measured-value sensor as electrodes in form of a facet structure or of an array.

4. A vehicle sensor according to claim 1, wherein the measured-value sensing elements (4.1.5, 4.1.6) are arranged in form of a digital structure or of a self-testing structure.

5. A vehicle sensor according to claim 1, wherein dimensions of the measured-value sensing elements (4.1.x) are smaller than a smallest wave length to be detected of the impact sound.

6. A vehicle sensor according to claim 1, wherein dimensions of the measured-value sensing elements (4.1.x) are greater than a greatest wave length to be detected of the impact sound.

7. A vehicle sensor according to claim 1 further comprising: a carrier (4.3) for the measured-value sensor (4.1), wherein the carrier is embodied as a substrate, a wiring carrier or a foil.

8. A vehicle sensor according to claim 7, wherein the measured-value sensor (4.1) is connected to the carrier (4.3) via a force-fit and form-fit connection (4.8.1, 4.8.3).

9. A vehicle sensor according to claim 8, wherein the form-fit connection (4.8.1, 4.8.3) between the measured-value sensor (4.1) and the carrier (4.3) is a glued spot or a contact layer.

10. A vehicle sensor according to claim 1 further comprising: an acceleration sensor (4.4).

11. A vehicle sensor according to claim 1, wherein the measured-value sensing elements (4.1.x) are coupled to the vehicle structure (5) via at least one mechanical contact point (11.1) for transmitting the impact sound waves.

12. A vehicle sensor according to claim 11, wherein the mechanical contact point is cone shaped, the base area of the cone being circular or oval.

13. A vehicle sensor according to claim 11, wherein distances between the mechanical contact points (11.1) are smaller than the smallest wave length to be detected of the impact sound.

14. A vehicle sensor according to claim 11, wherein distances between the mechanical contact points (11.1) are greater than the greatest wave length to be detected of the impact sound.

15. A vehicle sensor according to claim 1, wherein the vehicle sensor is used in conjunction with a safety device of a vehicle.

16. A vehicle sensor according to claim 1, wherein the vehicle sensor is used in conjunction with a diagnostic device of a vehicle.

17. A vehicle sensor (4) for detecting impact sound, the sensor comprising:
 a measured-value sensor (4.1) for detecting the impact sound; and multiple individual, separate measured-value sensing elements (4.1.x), each of which is coupled to a vehicle structure (5) in such a way that impact sound waves are transmitted by the vehicle structure (5) to the measured-value sensing elements (4.1.x), wherein the measured-value sensing elements (4.1.x) are coupled to the vehicle structure (5) by an elastic (7.1) or a visco-elastic (7.2) coupling layer for transmitting the impact sound waves and the multiple individual, separate measured-value sensing elements comprise at least eight measured-value sensing elements (4.1.3, 4.1.4).

18. A vehicle sensor (4) for detecting impact sound, the sensor comprising:

a measured-value sensor (4.1) for detecting the impact sound; and multiple individual, separate measured-value sensing elements (4.1.x), each of which is coupled to a vehicle structure (5) in such a way that impact sound waves are transmitted by the vehicle structure (5) to the measured-value sensing elements (4.1.x), wherein the measured-value sensing elements (4.1.x) are coupled to the vehicle structure (5) by an elastic (7.1) or a visco-elastic (7.2) coupling layer for transmitting the impact sound waves wherein the vehicle sensor is provided in a vehicle for evaluating superimposed impact sound waves, which are independent from each other or for differentiating between superimposed impact sound waves, which are independent from each other, as a variable band pass and/or effective value creator or as a parameter estimator or for the determination of statistic characteristics.

* * * * *